(No Model.) 4 Sheets—Sheet 3.
G. BACCI.
DEVICE FOR LOADING AND UNLOADING VESSELS.
No. 260,924. Patented July 11, 1882.
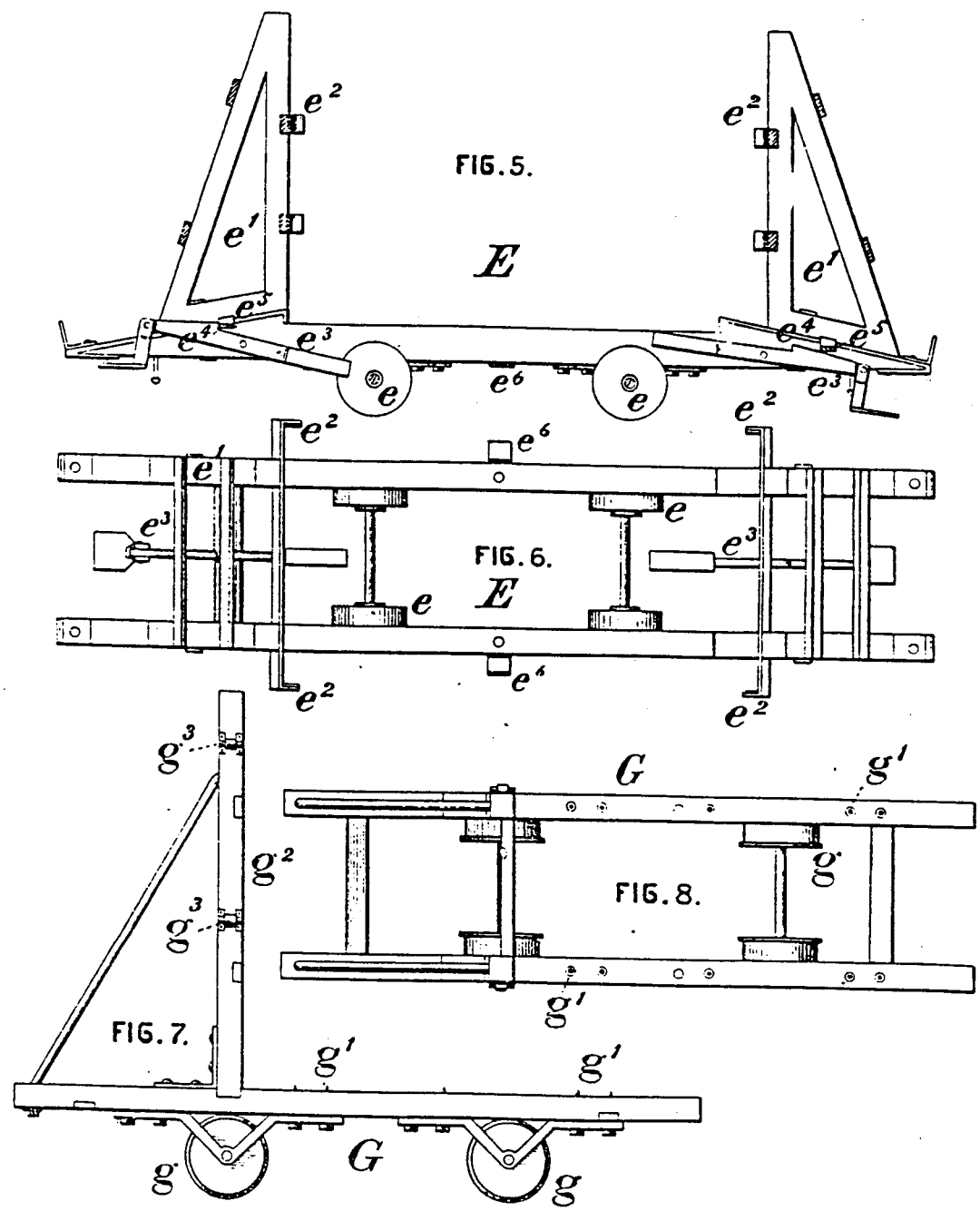
WITNESSES:
N. H. Culver
Geo. T. Kelly
INVENTOR
G. Bacci
By Collier & Bell
Attys.

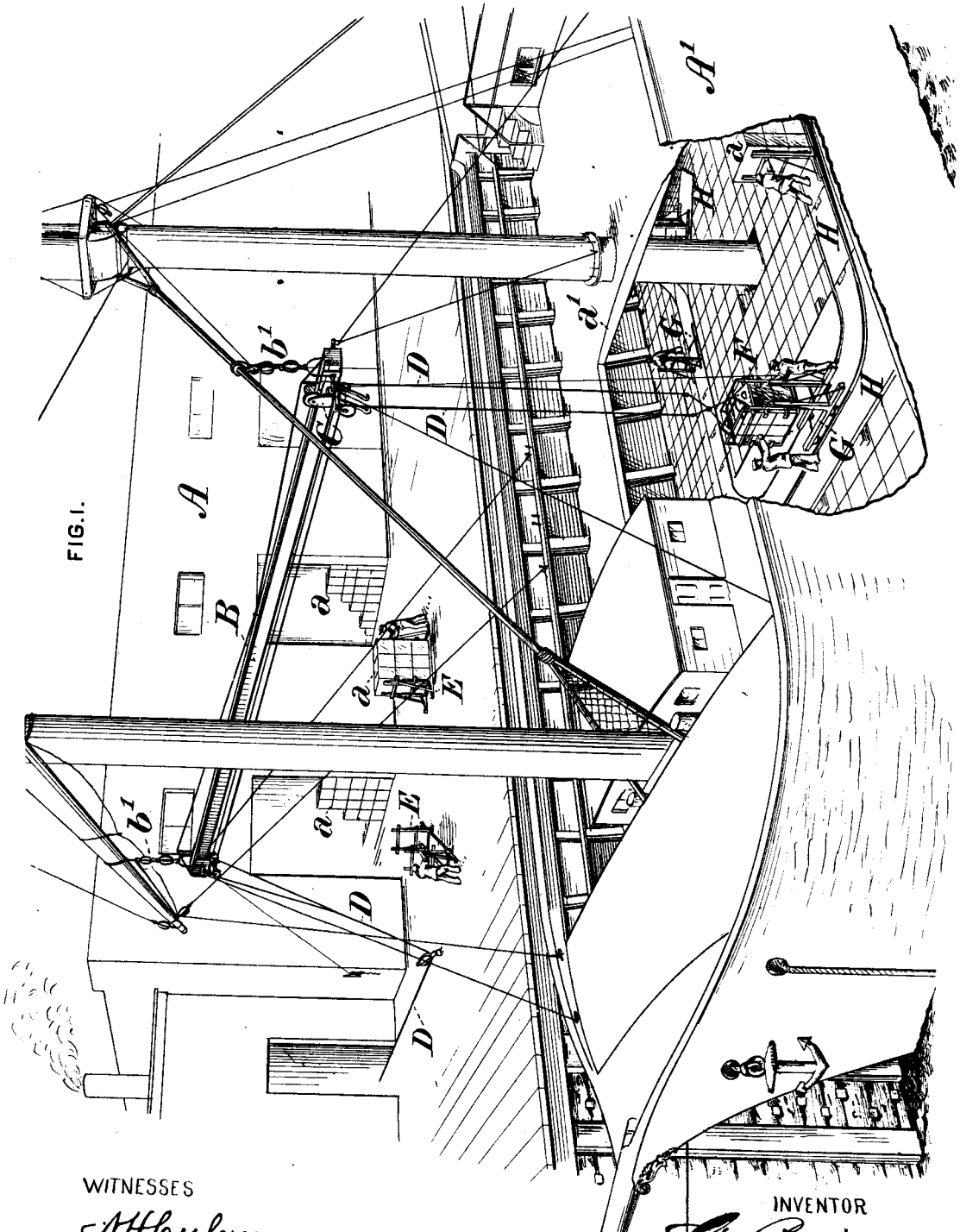

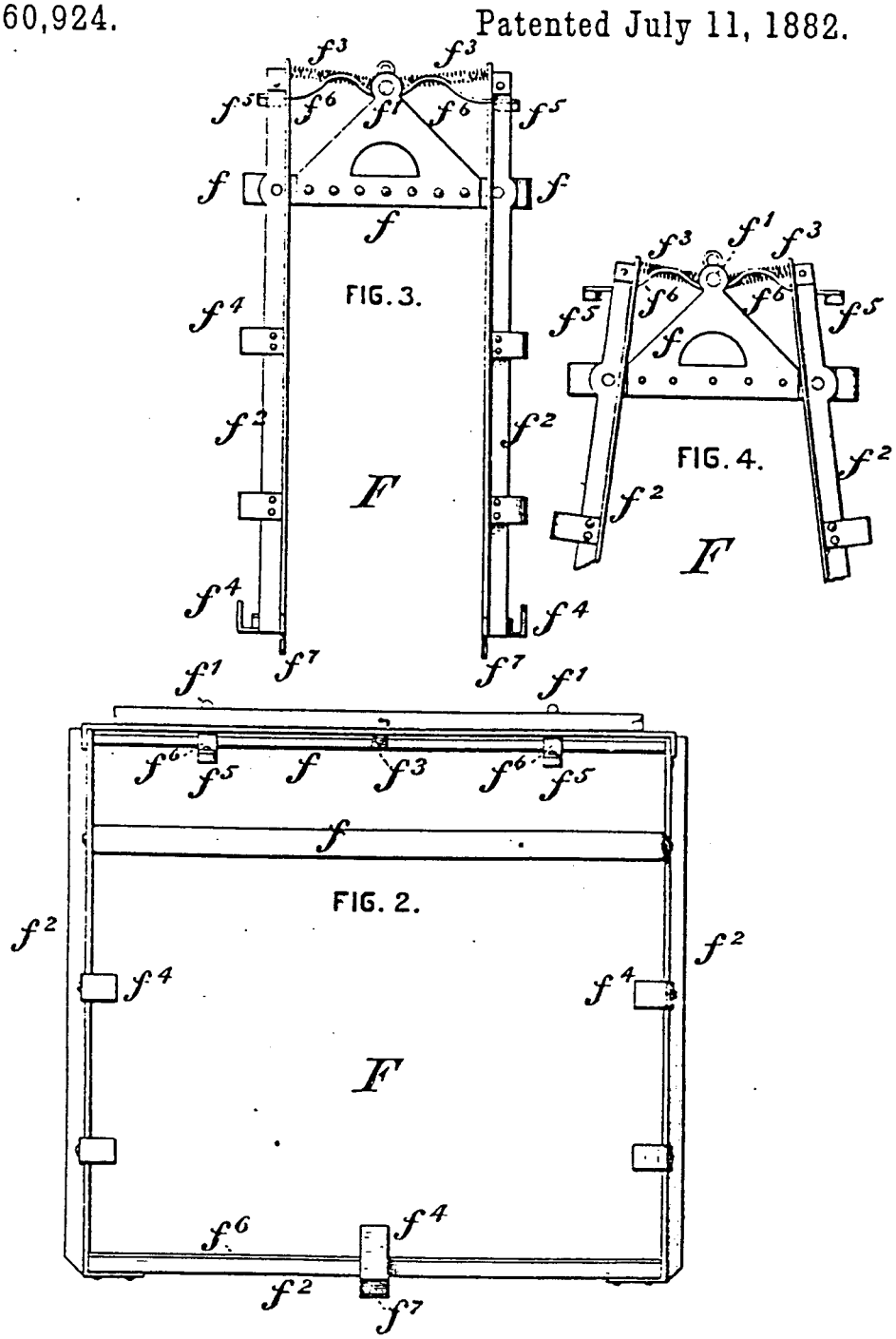

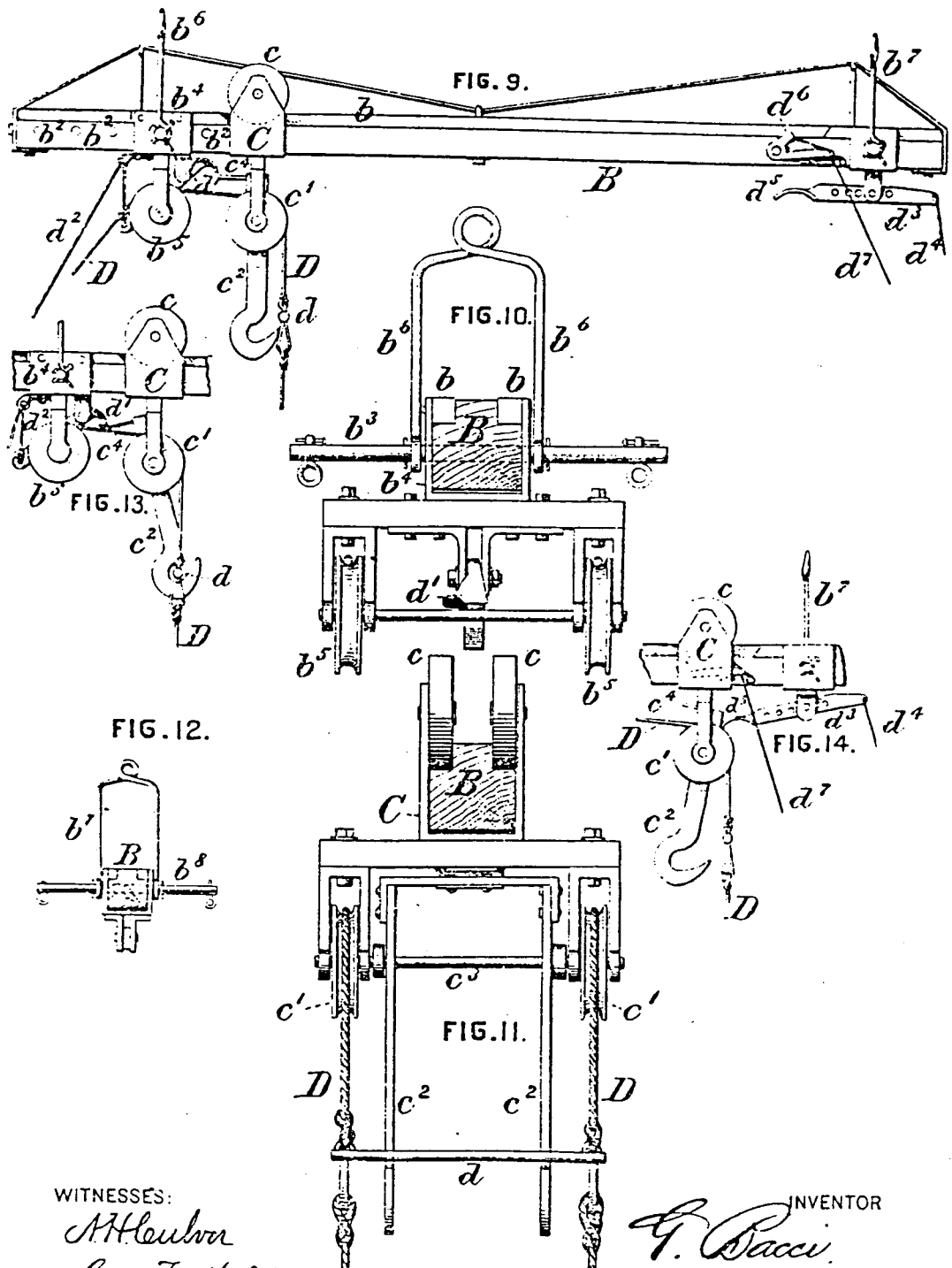

UNITED STATES PATENT OFFICE.

GIAMPAOLO BACCI, OF PHILADELPHIA, PENNSYLVANIA.

DEVICE FOR LOADING AND UNLOADING VESSELS.

SPECIFICATION forming part of Letters Patent No. 260,924, dated July 11, 1882.

Application filed June 2, 1882. (No model.)

*To all whom it may concern:*

Be it known that I, GIAMPAOLO BACCI, a subject of the King of Italy, residing at Philadelphia, in the county of Philadelphia and State of Pennsylvania, have invented certain new and useful Improvements in Loading and Unloading Vessels, of which improvements the following is a specification.

The object of my invention is to expedite and economize the loading and unloading of vessels, and to reduce the liability of breakage or injury of the cases or packages of freight in said operations.

To this end my improvements consist in a novel method of simultaneously delivering a series of cases to a carriage traveling upon a suspended track-beam, releasing the cases from said carriage, simultaneously delivering them to a truck, and conveying them to a desired point of deposit; also, in certain devices and combinations embracing a delivery-truck, a lifter, a track-beam, engaging and disengaging mechanism, an adjustable track and a stowing-truck, all as hereinafter more fully set forth.

In the accompanying drawings, Figure 1 is a view in perspective illustrating the loading of a vessel by my invention; Fig. 2, a side view, in elevation, of the lifter; Fig. 3, an end view of the same when closed to retain its load; Fig. 4, a similar view of the same when opened to deliver its load; Fig. 5, a longitudinal section through the delivery-truck; Fig. 6, a plan view of the same; Fig. 7, a side view, in elevation, of the stowing-truck; Fig. 8, a plan view of the same; Fig. 9, a side view, in elevation, of the track-beam and its traveling carriage; Fig. 10, a transverse section, on an enlarged scale, through the track-beam, showing the hoisting-rope attachments; Fig. 11, a similar section, showing an end view of the traveling carriage; Fig. 12, an end view of the track-beam as seen from the right; Fig. 13, a side view, showing the manner of connecting the carriage with the hoisting-ropes of the lifter at the receiving end of the beam; and Fig. 14, a similar view, showing the manner of connecting the carriage and the hoisting-ropes at the discharge end of the beam.

My invention is herein shown as applied to the transfer of a series of cases or packages, *a*, from a warehouse, A, to the hold of a vessel, A', and their stowage therein. The reverse operation—to wit, that of unloading the vessel—being accomplished in a similar manner and by similar apparatus, will be obvious without specific description.

A stationary track-beam, B, having ways or tracks *b* for the passage of a carriage on its upper side, is suspended in such adjusted position as to have its discharging end above and in convenient proximity to one of the hatches, *a'*, of the vessel to be loaded. In the instance shown the track-beam B is connected by slings *b'* to the rigging of the vessel; but, if preferred, it may be supported by a post on the wharf in the manner of the arm of a crane. A series of transverse openings, $b^2$, is formed in the beam adjacent to its receiving end, for the insertion of the pin $b^3$, which supports the bearing $b^4$ of the hoisting-rope sheaves $b^5$, and to which the arms $b^6$ for the connection of the suspending-sling are connected. The receiving end of the track-beam is to be suspended at a greater elevation than its discharging end, to admit of the traverse of the carriage or traveler by its own gravity when carrying its load of freight to the vessel. The discharging end of the beam is supported by arms $b^7$, connected to a pin, $b^8$.

A carriage or traveler, C, is supported, so as to be capable of free movement upon the tracks of the beam, by a pair of rollers, *c*, and a pair of sheaves, *c'*, are mounted in bearings in the carriage below the track-beam, at such distance apart as to be in line transversely with the hoisting-rope sheaves $b^5$, which rotate in bearings secured to the track-beam below the suspending-arms $b^6$ of its receiving end. A pair of carrying-hooks, $c^2$, are pivoted on the shaft $c^3$ of the sheaves *c'*, the tendency of said hooks being to hang in an inclined position therefrom, as shown in Fig. 14, except when rocked upon the shaft $c^3$. The hoisting-ropes D, which are attached to the lifter presently to be described, pass around the sheaves *c'* and $b^5$, and are led to a suitable hoisting-engine upon the wharf. A transverse bar, *d*, connects the hoisting-ropes, and is engaged by the carrying-hooks $c^2$ when swung into the position shown in Fig. 13, in which case the weight suspended upon the hoisting-ropes is sustained by the hooks $c^2$ and carriage C. The engagement of the hooks $c^2$ and bar *d* at the receiving end of the beam is effected by a tripping-lever, $d'$, which is pivoted to the beam B in such position that one of its ends may bear upon an arm, $c^4$, secured to the hooks $c^2$ above the shaft $c^3$, the opposite end of the tripping-lever being connected to an operating-rope, $d^2$, and the hooks $c^2$ are engaged with the bar $d$ at the discharging end of the beam, in order to return the carriage and lifter by a tripping-lever, $d^3$, pivoted to the beam B below its point of suspension, and operated by a cord, $d^4$, the lever $d^3$ having a curved tongue, $d^5$, which bears against a bar connecting the hooks $c^3$ at their upper ends, and by swinging the hooks upon the shaft $c^3$ brings their lower ends into connection with the bar $d$. The carriage C is held stationary at the discharging end of the beam during the elevation of the hoisting-rope to the proper position for the engagement of the carrying-hooks and bar by a stop, $d^6$, pivoted to one side of the beam, and having a tooth over which the adjacent roller $c$ of the carriage rides on its discharging traverse, said stop preventing the backward traverse of the carriage until released by the cord $d^7$.

The cases $a$ are moved from their positions in the warehouse to a point immediately below the line of the hoisting-rope, when the carriage C stands at the receiving end of the track-beam B, by a delivery-truck, E, Figs. 5 and 6, consisting of a horizontal frame mounted on rollers $e$, and having inclined ways or guides at each of its ends, on which vertical clamping-standards $e'$ are fitted to slide longitudinally. The standards $e'$ are held in position to embrace between them a determined number of the boxes or cases of freight to be transferred by foot-levers $e^3$, pivoted on transverse bolts on the frame of the truck, and having shoulders $e^4$, which engage cross-bars $e^5$ on the vertical standards $e'$, and clamps or catches $e^2$ on each side of the standards $e'$ bear against the sides of the cases adjacent to them; and thereby contribute additionally to preventing the displacement of the cases. When the truck is to be loaded the standards $e'$ are allowed to slide outwardly into the position as shown on the right of the figures by releasing the foot-levers $e^3$ from the cross-bars $e^5$ of the standards. The cases are then piled upon the truck in desired number, and the standards pushed up to the position shown on the left of the figures, in which they are retained by the engagement of the foot-levers with the cross-bars. The loaded truck is then run out of the warehouse and brought under the hoisting-ropes D, to which is connected the lifter F, (shown in Figs. 2, 3, and 4,) by which the cases are to be elevated. The lifter is composed of a main suspending-frame, $f$, having eyes $f'$ for the attachment of the hoisting-ropes, and having swinging frames $f^2$, pivoted to its ends at each side. The frames $f^2$ are connected at top to the main frame $f$ by springs $f^3$, the tendency of which is to draw inwardly the upper ends of the swinging frames, and thereby to admit of the release of the litter from a contained series of cases. Clamps or catches $f^4$ are secured to the end and bottom bars of the swinging frames $f^2$, and cushions $f^5$, of rubber or other yielding material, are fixed upon the ends of spring-arms $f^6$, projecting laterally from the central bar of the main frame $f$. A facing, $f^8$, of rubber or analogous material, is also secured to the lower bars of the swinging frames.

In operation the lifter, which will naturally assume the position shown in Fig. 4, is lowered and guided by the attendant until the main frame fits over the upper row of cases on the delivery-truck E and the cushions $f^5$ bear upon the tops of the cases. The attendants then push the swinging frames inwardly against the cases until they assume the position shown in Fig. 3, and the lifter is closed on its load by the engagement of a projection, $f^7$, on the lower bar of each swinging frame, with a catch, $e^6$, on the truck. The lifter is then elevated by the hoisting-engine, and the weight of the cases being exerted upon the lifter before the projections $f^7$ leave the catches $e^6$, the weight of the cases will prevent the opening of the lifter during its elevation and transfer by the carriage C along the track-beam, and it will remain closed until automatically opened by contact with the stowing-truck G, which is located in the hold of the vessel in readiness to receive the loaded lifter.

The stowing-truck G consists of a horizontal frame mounted on flanged wheels $g$, which are adapted to run upon rails secured to portable and adjustable track-platforms H, laid in different positions, as required, in the hold of the vessel, so as to enable the truck to deliver its load at any desired point therein. Pins $g'$ project from the frame of the truck and enter the lower tier of cases to prevent their accidental displacement in transit, and a pair of vertical standards, $g^2$, provided with side friction-rollers, $g^3$, are secured to the truck adjacent to one of its ends.

The opening of the lifter F and its release from its load of cases are effected by its contact with the friction-rollers on the standards of the stowing-truck. The lifter is stopped suspended a short distance above the truck-platform, and the stowing-truck is pushed beneath it, and in such position that the standards $g^2$ will enter between the swinging frames of the lifter, which is then lowered until the lowest row of cases of its load rests upon the floor of the truck, when the swinging frames, being relieved from the weight of the load and being subject to the pressure of the friction-rollers on the truck-standards, will be acted on by the springs $f^3$, and the lifter will be consequently released from the cases, and is then elevated to receive another load in the hold.

It will thus be seen that the cases of freight to be loaded are carried in uniform drafts or loads by the delivery-truck to the lifter, and transported by the lifter and carriage of the track-beam to a point in the hold of the vessel at which the lifter is automatically released from the cases. The lifter is elevated and returned to its original position in readiness to receive the next load, and the load already put on board is transported over the portable track-platforms to the desired location of stowage.

I claim as my invention and desire to secure by Letters Patent—

1. The improvement in the art of loading vessels, which consists in the following successive steps, to wit, simultaneously transferring a determined number of cases or packages from a place of storage to a lifter, elevating said lifter and its load to a carriage traveling upon a track suspended above the deck of a vessel, releasing the lifter and its load from the carriage and lowering them together into the hold of the vessel, and delivering the load from the lifter to a stowage-truck, substantially as set forth.

2. The combination of a delivery-truck, a lifter, an elevating device, a suspended track-beam, a carriage adapted to travel thereon, mechanism for engaging and disengaging the lifter and carriage, and a stowage-truck, substantially as set forth.

3. The combination of a lifter having swinging frames, as described, a hoisting-rope, a suspended track-beam, a carriage adapted to travel thereon, and mechanism for engaging and disengaging the lifter and carriage, substantially as set forth.

4. The combination of a lifter having swinging frames which support a load of cases or packages, and a stowage-truck having standards which release the lifter from the load, substantially as set forth.

5. The combination of a delivery-truck having movable clamping standards to receive a series of cases or packages, and a lifter having swinging frames adapted to embrace and simultaneously remove said series from the truck, substantially as set forth.

6. The combination of a suspended track-beam, a carriage adapted to travel thereon, elevating mechanism, and a stowage-truck traveling upon a portable track located in the hold of a vessel, substantially as set forth.

GIAMPAOLO BACCI.

Witnesses:
J. SNOWDEN BELL,
GEORGE T. KELLY.